United States Patent
McKenney et al.

(10) Patent No.: US 9,529,839 B2
(45) Date of Patent: Dec. 27, 2016

(54) APPLYING LIMITED-SIZE HARDWARE TRANSACTIONAL MEMORY TO ARBITRARILY LARGE DATA STRUCTURE

(75) Inventors: Paul E. McKenney, Beaverton, OR (US); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1769 days.

(21) Appl. No.: 12/632,260

(22) Filed: Dec. 7, 2009

(65) Prior Publication Data

US 2011/0137962 A1    Jun. 9, 2011

(51) Int. Cl.
*G06F 7/00* (2006.01)
*G06F 17/00* (2006.01)
*G06F 17/30* (2006.01)

(52) U.S. Cl.
CPC ... *G06F 17/30371* (2013.01); *G06F 17/30348* (2013.01)

(58) Field of Classification Search
CPC .............. G06F 17/30008; G06F 17/30348
USPC ......................... 707/610, 818, 703
See application file for complete search history.

(56) References Cited

U.S. PATENT DOCUMENTS

| | | | | |
|---|---|---|---|---|
| 7,669,015 | B2* | 2/2010 | Dice et al. ............. | 711/152 |
| 8,028,133 | B2* | 9/2011 | Dice et al. ............. | 711/152 |
| 2002/0016900 | A1* | 2/2002 | Miller ................ | 711/220 |
| 2003/0182465 | A1* | 9/2003 | Moir et al. ............ | 709/314 |
| 2007/0198518 | A1* | 8/2007 | Luchangco et al. ..... | 707/8 |
| 2007/0282838 | A1* | 12/2007 | Shavit et al. ......... | 707/8 |
| 2008/0082532 | A1* | 4/2008 | McKenney ............. | 707/8 |
| 2008/0288744 | A1* | 11/2008 | Gonion et al. ........ | 711/210 |
| 2010/0138571 | A1* | 6/2010 | Cain et al. ........... | 710/56 |
| 2011/0252000 | A1* | 10/2011 | Diaconu et al. ....... | 707/638 |

FOREIGN PATENT DOCUMENTS

EP    0442715    10/1997

OTHER PUBLICATIONS

Herlihy et al., "Transactional Memory: Architectural Support for Lock-Free Data Structures," ISCA, 1993, pp. 289-300.
Shavit et al., "Software Transactional Memory," PODC, 1995, pp. 204-213.
Herlihy et al., "Software Transactional Memory for Dynamic-Sized Data Structures," PODC, 2003, pp. 92-101.
Dice et al., "Transactional Locking II," DISC 2006, pp. 194-208.
Ananian et al., "Unbounded Transactional Memory," IEEE Micro, 2006, pp. 59-69.
Dice et al., "Early Experience With a Commercial Hardware Transactional Memory Implementation," ASPLOS, 2009, pp. 12-24.

(Continued)

*Primary Examiner* — Boris Gorney
*Assistant Examiner* — Griselle C Roland
(74) *Attorney, Agent, or Firm* — Walter W. Duft

(57) ABSTRACT

A technique for applying hardware transaction memory to an arbitrarily large data structure is disclosed. A data updater traverses the data structure to locate an update point using a lockless synchronization technique that synchronizes the data updater with other updaters that may be concurrently updating the data structure. At the update point, the updater performs an update on the data structure using a hardware transactional memory transaction that operates at the update point.

5 Claims, 7 Drawing Sheets

(56) References Cited

OTHER PUBLICATIONS

Kumer et al., "Hybrid Transactional Memory," ACM SIGPLAN, 2006, pp. 1-12.
McKenney, "RCU part 3: the RCU API," downloaded from <http://lwn.net/Articles/264090>, 2008, pp. 1-7.
McKenney, "RCU part 2: Usage," downloaded from <http://lwn.net/Articles 263130>, pp. 1-17.
McKenney et al., "What is RCU, fundamentally?," downloaded from <http://lwn.net/Articles 262464>, pp. 1-17.
Michael, "Hazard Pointers: Safe Memory Reclamation for Lock-Free Objects," IEEE Transactions on Parallel and Distributed Systems, 2004, 15(6):491-504.
Rossbach et al., "TxLinux: Using and Managing Transactional Memory in an Operating System ," ACM SIGOPS, 2007, pp. 1-15.
Spear et al., "Inevitability Mechanisms for Software Transactional Memory," ACM SIGPLAN, 2008, pp. 1-9.
Saha et al., "Architectural Support for Software Transactional Memory," MICRO, 2006, pp. 185-196.
Harris et al., "Language Support for Lightweight Transactions," OOPSLA, 2003 pp. 1-15.
Harris, "Exceptions and side-effects in atomic blocks," CSJP, 2004, pp. 1-8.
Damron et al., "Hybrid Transactional Memory," ASPLOS, 2006, pp. 1-11.
Moore et al., "LogTM: Log-based Transactional Memory," HPCA-12, 2006, pp. 1-12.
Zilles et al., "Extending Hardware Transactional Memory to Support Non-Busy Waiting and Non-Transactional Actions," CS. UIUC, 2006, pp. 1-10.

\* cited by examiner

TRAVERSE AND UPDATE OPERATION USING RCU

```
1  int insert(int key)
2  {
3    struct node *p = malloc(sizeof(*p));
4    struct node **q;
5    struct node *qprev;
6    struct node *qnext;
7
8    p->key = key;
9    p->deleted = 0;
10 retry:
11   rcu_read_lock();
12   q = &head;
13   qprev = NULL;
14   while (*q != NULL && rcu_dereference(*q)->key < p->key) {
15     qprev = rcu_dereference(*q);
16     q = &qprev->next;
17   }
18   if (!begin_transaction()) {
19     rcu_read_unlock();
20     goto retry;
21   }
22   qnext = rcu_dereference(*q);
23   if ((qprev != NULL && (qprev->deleted || qprev->next != qnext)) ||
24       (qnext != NULL && qnext->deleted))
25     abort_transaction();
26   if (*q == NULL || rcu_dereference(*q)->key != p->key) {
27     rcu_assign_pointer(p->next, *q);
28     rcu_assign_pointer(*q, p);
29     retval = 1;
30   } else
31     retval = 0;
32   end_transaction();
33   rcu_read_unlock();
34   return retval;
35 }
```

*FIG. 3*

TRAVERSE AND UPDATE OPERATION USING JAVA™
VOLATILE VARIABLES AND GARBAGE COLLECTION

```
1  boolean insert(Key key) {
2  /* The Node.next field is volatile */
3  Node node = new Node(key);
4  while (true) {
5    Node prev = head;
6    Node cur = prev.next;
7    Node next;
8    boolean found = false;
9    boolean valid;
10   while (!found) {
11     if (cur == null) {
12       found = true;
13       break;
14     }
15     atomic {
16       next = cur.next;
17       valid = (prev.next == cur);
18     }
19     if (!valid) break;
20     Key k = cur.key;
21     if (k >= key) {
22       if (k == key) return false;
23       found = true;
24       break;
25     }
26     prev = cur;
27     cur = next;
28   }
29   if (!found) continue;
30   boolean ret = false;
31   atomic {
32     if (prev.next == cur) {
33       node.next = cur;
34       prev.next = node;
35       ret = true;
36     }
37   }
38   if (ret) return true;
39  }
40 }
```

*FIG. 4*

TRAVERSE AND UPDATE OPERATION USING
SMALL TRANSACTIONS AND NON-JAVA™ GARBAGE COLLECTION

```
1  #define atomic_advance(p) \
2  ({ \
3     typeof(p) _____ p1; \
4     while (!begin_transaction()) continue; \
5     _____ p1 = p; \
6     end_transaction(); \
7     _____ p1; \
8  })
```

*FIG. 5*

TRAVERSE AND UPDATE OPERATION USING
HAZARD POINTERS

```
1  boolean insert(Key key) {
2    Node * node = new Node(key);
3  start:
4    boolean found = false;
5    boolean ret = false;
6    Node ** prev = &head;
7    while(!begin_transaction());
8    Node * cur = *prev;
9    set_hazard_pointer(1,cur);
10   end_transaction();
11   while (true) {
12     if (cur == null) {
13       found = true;
14       break
15     }
16     while (!begin_transaction());
17     boolean valid = (*prev == cur);
18     Node * next = cur->next;
19     set_hazard_pointer(2,cur);
20     set_hazard_pointer(1,next);
21     end_transaction();
22     if (!valid) goto start:
23     Key k = cur.key;
24     if (k >= key) {
25       if (k == key) goto end;
26       found = true;
27       break;
28     }
29     prev = &cur->next;
30     cur = next;
31   }
32   if (found) {
33     while (!begin_transaction());
34     if (*prev == cur) {
35       node->next = cur;
36       *prev = node;
37       ret = true;
38     }
39     end_transaction();
40   }
41   if (!ret) goto start;
42 end:
43   clear_hazard_pointers(1,2);
44   return ret;
45 }
```

*FIG. 6*

```
TRAVERSE AND UPDATE OPERATION USING
          WATCH PRIMITIVES 1  boolean insert(Key key) {
2    Node * node = new Node(key);
3  start:
4    boolean found = false;
5    Node ** prev = &head;
6    Node * cur = load_and_set_watch(*prev);
7    while (true) {
8     if (cur == null) {
9        found = true;
10       break;
11    }
12    Node * next = load_and_set_watch(&cur->next);
13    Key k = cur.key;
14    if (!check_all_watches()) goto start;
15    if (k >= key) {
16       if (k == key) { clear_all_watches(); return false; }
17       found = true;
18       break;
19    }
20    if (!w_same_cache_line(&cur->next, prev))
21       clear_watch(prev);
22    prev = &cur->next;
23    cur = next;
24   }
25   if (found) {
26    boolean ret = false;
27    while (!begin_transaction());
28    node.next = cur;
29    prev.next = node;
30    ret = true;
31    end_transaction();
32    clear_all_watches(); if (ret) return true;
33   }
34   goto start;
35 }
```

*FIG. 7*

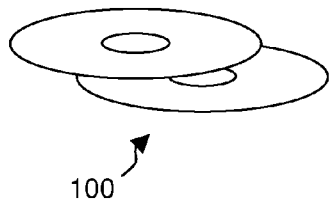

*FIG. 8*

APPLYING LIMITED-SIZE HARDWARE TRANSACTIONAL MEMORY TO ARBITRARILY LARGE DATA STRUCTURE

BACKGROUND

1. Field of the Invention

The present invention relates to computer systems and methods in which data resources are shared among concurrent data consumers while preserving data integrity and consistency relative to each consumer. More particularly, the invention concerns a concurrency mechanism known as transactional memory.

2. Description of the Prior Art

By way of background, transactional memory (TM) can be implemented in either hardware or software. Although both approaches are viable candidates for use in the design and construction of shared-memory parallel software, hardware transactional memory (HTM) operates more efficiently than software transactional memory (STM). On other hand, with the exception of certain research prototypes that are not currently practical for production use, HTM's small transactional memory size (the classic example being an L1 cache) imposes limitations on the amount of data that can participate in a given transaction as well as the types of operations that may be performed within a transaction. Consequently, small memory HTM is not generally suitable for accessing large data structures.

There are many schemes for extending the reach of HTM to handle larger transactions. Most involve best effort approach wherein HTM transaction processing is used if possible, but with a software-based fallback option being provided (such as reverting to locking or STM) in the event of HTM failure. These hybrid schemes have drawbacks such as reduced concurrency, increased overhead, and increased complexity, particularly in retry/contention-manager semantics.

There is a need for a mechanism that permits limited size HTM implementations to perform small memory manipulations on unbounded multi-linked lists or other arbitrarily large data structures, in order to gain the benefits of HTM, while either eliminating or reducing the severity of the drawbacks normally associated with use of HTM on such data.

SUMMARY

A technique for applying hardware transaction memory to an arbitrarily large data structure is disclosed. A data updater traverses the data structure to locate an update point using a lockless synchronization technique that synchronizes the data updater with other updaters that may be concurrently updating the data structure. At the update point, the updater performs an update on the data structure using a hardware transactional memory transaction that operates at the update point.

BRIEF DESCRIPTION OF THE DRAWINGS

The foregoing and other features and advantages of the invention will be apparent from the following more particular description of example embodiments, as illustrated in the accompanying Drawings, in which:

FIG. 3 is a pseudocode diagram showing example operations to update a data structure using hardware transactional memory and one example type of lockless synchronization that uses read-copy update to protect the data structure traversal;

FIG. 4 is a pseudocode diagram showing example operations to update a data structure using hardware transactional memory and another example type of lockless synchronization that uses a series of small transactions, Java™ volatiles and Java™ garbage collection to protect the data structure traversal;

FIG. 5 is a pseudocode diagram showing an alternative way to implement small transactions during data structure traversal in non-Java™ environments;

FIG. 6 is a pseudocode diagram showing example operations to update a data structure using hardware transactional memory and another example type of lockless synchronization that uses a series of small transactions and hazard pointers to protect the data structure traversal;

FIG. 7 is a pseudocode diagram showing example operations to update a data structure using hardware transactional memory and another example type of lockless synchronization that uses watch primitives to protect the data structure traversal; and FIG. 8 is a diagrammatic illustration of example media that may be used to provide a computer program product for applying hardware transactional memory to an arbitrarily large data structure.

DETAILED DESCRIPTION OF EXAMPLE EMBODIMENTS

Example Machine Environment

Figure 1:
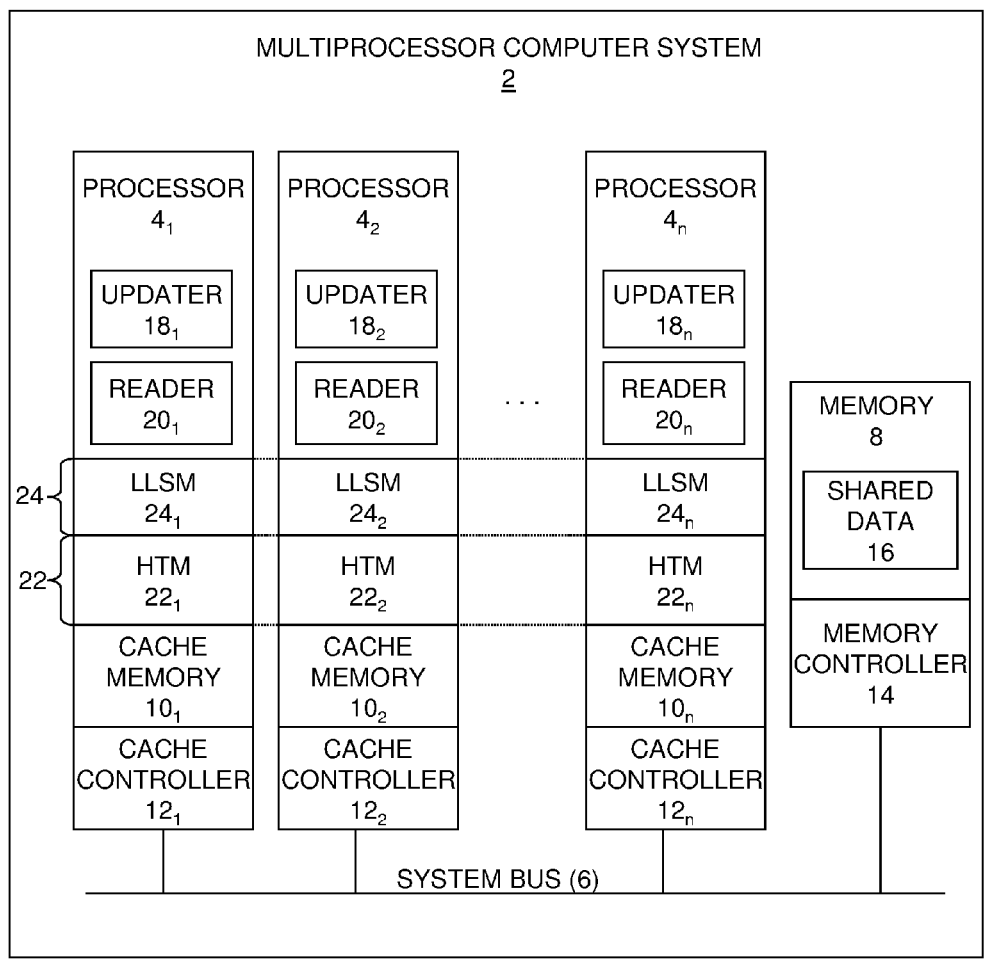
FIG. 1 is a functional block diagram showing an example computing system that implements data readers, data updaters, a hardware transactional memory subsystem, and a lockless synchronization mechanism subsystem.

Turning now to the figures, wherein like reference numerals are used to represent like elements in all of the several views, FIG. 1 illustrates an example computing environment that may be used to support the application of hardware transactional memory to arbitrarily large data structures, as disclosed herein. In particular, an example computing system 2 is shown that may be implemented a variety of different computing environments, including but not limited to general purpose computers, special purpose computers, portable computing devices, communication and/or media player devices, set-top devices, embedded systems, to name but a few. The system 2 includes one or more processors 4 (e.g., $4_1, 4_2 \ldots 4_n$) that are connected by way of a system bus 6 (or other communication pathway) to a memory 8. As used herein, a "processor" refers to a single-threaded or multi-threaded CPU (Central Processing Unit) core within a single-core or multi-core processing device (with each core being considered a CPU) that executes program instruction logic, such as software or firmware. The memory 8 may comprise any type of tangible storage medium capable of storing data in computer readable form. The processors 4 and the memory 8 may be situated within a single computing node (e.g., as part of a single-node SMP system) or they may be distributed over plural nodes (e.g., as part of a NUMA system or cluster). Conventional cache memories 10 (e.g., $10_1, 10_2 \ldots 10_n$) and cache controllers 12 (e.g., $12_1, 12_2 \ldots 12_n$) may be respectively associated with the processors 4. A conventional memory controller 14 may be associated with the memory 8. The memory controller 14 may be integrated with the processors 4 or could be provided separately therefrom (e.g. as part of a chipset).

Tasks executing on the processors 4 (e.g., processes, threads or other execution contexts running in kernel or user mode) occasionally implement update operations (updaters) 18 (e.g., $18_1, 18_2 \ldots 18_n$) to update the shared data 16 stored in the memory 8. These updates may include modifying, inserting and deleting elements of a linked list, and other types of operations (involving lists or other data structures). Read operations (readers) 20 (e.g., $20_1, 20_2 \ldots 20_n$) are likewise implemented to reference the shared data 16 for reading. In addition, the updaters 18 will act as readers of the shared data 16 when they search a data structure (such as a linked list) to identify the point at which an update is to be performed (update point), such as the location in a linked list where an element is to be inserted, modified or deleted.

A Hardware Transactional Memory (HTM) subsystem 22 is provided for use by the updaters 18 to serialize their updates to the shared data 16. The HTM subsystem 22 includes HTM subsystem instances (e.g., $22_1, 22_2 \ldots 22_n$) that may be respectively associated with each processor 4. In some implementations of the system 2, the HTM subsystem 22 may comprise a small memory HTM whose hardware transactional memory size imposes restrictions on the amount of data that can participate in a given transaction or on the types of operations that may be performed within the transaction. In such cases, the HTM subsystem 22 may have insufficient hardware transactional memory to support a transaction involving some arbitrarily large data structure (e.g., a large linked list) within the shared data 16. One example of a limited size HTM implementation would be Herlihy's cache-based transactional memory (see Herlihy et al., "Transactional Memory: Architectural Support for Lock-Free Data Structures," Proceedings of the $20^{th}$ Annual International Symposium on Computer Architecture, (1993)). As will be seen below, the present disclosure describes a technique that may be used to work within the size limitations of the HTM subsystem 22. Moreover, the disclosed technique may be used even in cases where the HTM subsystem 22 does have sufficient HTM memory to handle large data structures. In that situation, the technique disclosed herein may be used to provide an alternative to a purely transactional approach to data updates, and may provide performance advantages over purely transactional approaches because the smaller transaction sizes can be expected to reduce the number of conflicts and thus the number of rollback/retry operations.

Because HTM is a conventionally known and well-documented technique, details of the particular manner in which the HTM subsystem 22 supports HTM transactions are omitted from the present discussion. It is sufficient to note that the HTM subsystem 22 uses hardware techniques (such as Herlihy's cache algorithms and related processor instructions) that allow the updaters 18 to update the shared data 16 using serialized transactions that tend to be atomic, consistent, isolated, and to some extent durable. During each transaction, the HTM subsystem 22 uses specialized load and store instructions that operate on the transaction's read and write sets. As persons skilled in the art will appreciate, a transaction's read set and write set respectively represent the shared memory values that have been read and written during the transaction. Each transaction either completes successfully without conflict with other transactions, in which case the transaction is committed, or it does not complete, in which case the transaction is aborted and rolled back. Roll back is performed by reverting the transaction state changes and reclaiming the memory locations used to hold uncommitted data written during the transaction.

The HTM subsystem 22 manages transaction state as a transaction proceeds to the point where it either commits or fails. A transaction will typically commit only if no other transaction has updated any location in the transaction's read or write set, and no other transaction has read any location in the transaction's write set. To make this determination, the HTM subsystem 22 implements a suitable form of conflict detection. When a transaction commits, the transaction's changes to its write set become finalized. If the commit fails, the transaction aborts. A transaction abort causes all changes to the transaction's write set (i.e., the uncommitted transaction data) to be discarded. This is known as a roll back. The HTM subsystem 22 manages transaction rollback and the reclamation of memory associated with uncommitted transaction data following a transaction abort. As is conventional, the HTM subsystem 22 implements a program interface comprising transaction primitives that the updaters 18 can use to manage transactions. Operations supported by these HTM primitives may include some or all of the following: delimit transaction start and stop points, abort transactions, restart transactions, interrupt and restore transactions, etc.

A lockless synchronization mechanism (LLSM) subsystem 24 is additionally provided for use by the updaters 18 (and the readers 20). The LLSM subsystem 24 includes plural LLSM subsystem instances (e.g., $24_1, 24_2 \ldots 24_n$) that may be respectively associated with each processor 4. The LLSM subsystem 24 allows the shared data 16 to be concurrently accessed for reading and updating without the use of locks or other computationally expensive synchronization mechanisms (e.g., writes to shared memory, memory barriers, atomic instructions). As described in more detail below, the LLSM subsystem 24 may be implemented using any of a variety of lockless synchronization techniques.

Introduction To Hardware Transactional Memory For Arbitrarily Large Data Structures The present disclosure presents a technique whereby the HTM subsystem 22 is used to perform small memory manipulations on unbounded multi-linked lists or other arbitrarily large data structures. This technique provides the benefits of hardware transactional memory while either eliminating or reducing the severity of the drawbacks normally associated with use of hardware transactional memory for such data. As will be described in more detail below in the context of specific example embodiments, the technique operates within the context of plural updaters 18 that may be concurrently accessing the shared data 16 to perform data updates. Each update involves traversing the data structure to locate an update point within the data structure, then performing the update. Examples would be the deletion, insertion or modification of an element in a linked list.

Figure 2:
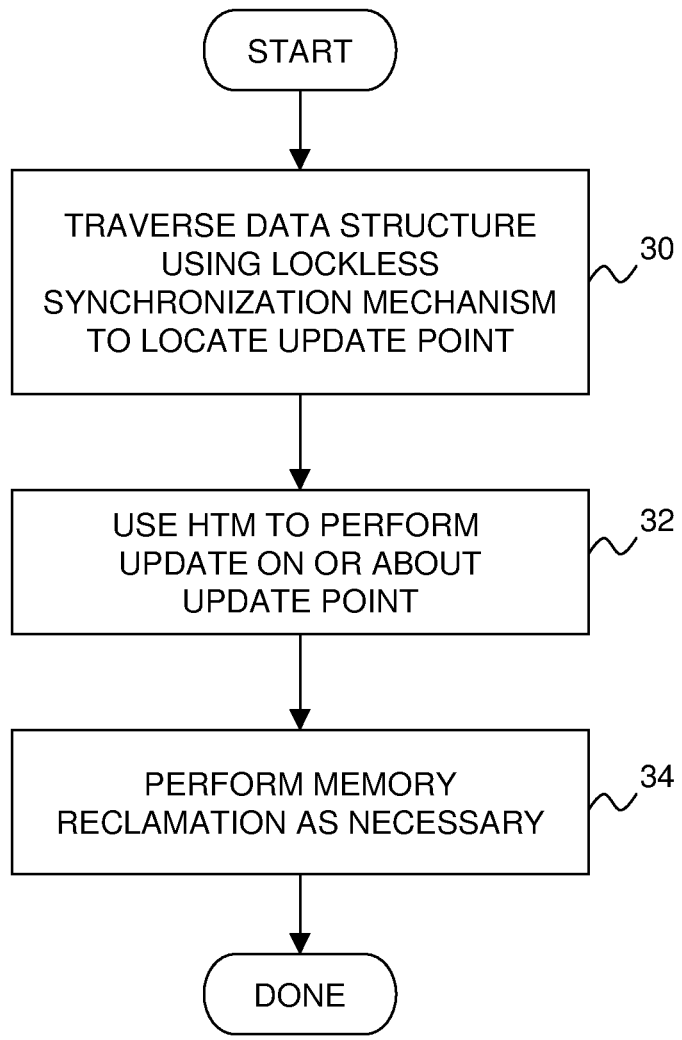
FIG. 2 is a flow diagram showing example operations to update a data structure using hardware transactional memory and lockless synchronization to traverse the data structure to the update point.

The idea underlying the disclosed technique is to interleave lockless synchronization with hardware transactional memory during data updates, using lockless synchronization to reach the update point and an HTM transaction to perform the update. FIG. 2 illustrates example operations. In block 30, an updater 18 traverses a data structure of the shared data 16 to locate an update point at which an update will be performed. The LLSM subsystem 24 protects the traversal using a lockless data synchronization technique that synchronizes the updater with other tasks that may be concurrently updating the data structure. In block 32, upon reaching the update point, the updater 18 performs the update using the HTM subsystem 22. The HTM subsystem 22 implements an HTM transaction that operates at the update point rather than the entire data structure. For example, if the update point is an element that is to be inserted in a linked list, the transaction may operate on the list element to be inserted and on the list elements on either side of the insertion point. In any case, the transaction may be designed so that it does not exceed the size of the available hardware transactional memory. In block 34, the LLSM subsystem 24 optionally performs memory reclamation, as necessary, in a manner that protects other tasks that may be traversing the data structure.

First Example Embodiment Using Read-Copy Update

Turning now to FIG. 3, example pseudocode is shown in which the LLSM subsystem 24 implements a Read-Copy Update (RCU) synchronization mechanism to protect an updater's data structure traversal to the update point. As is known, the RCU technique allows readers to traverse data structures without using locks. Instead readers use the RCU primitives rcu_read_lock( ) and rcu_read_unlock( ) when respectively entering and leaving an RCU-protected read-side critical section. Another RCU primitive, known as rcu_dereference( ) is used by readers when fetching RCU-protected pointers during list traversal. In the Linux™ kernel, this primitive is a macro that constrains both compiler and CPU optimizations in order to ensure that readers do not fetch a new pointer, but then later see old data when dereferencing that pointer.

When a data structure is updated, the RCU implementation defers memory reclamation until the readers have left their RCU read-side critical sections. This deferral is known as a "grace period." On the update side, deferred reclamation is initiated using the RCU primitives call_rcu( ) or synchronize_rcu( ) Another RCU primitive, known as rcu_assign_pointer( ) is used by updaters to assign new values to RCU-protected pointers. In the Linux™ kernel, this primitive is a macro that implements a write memory barrier known as smp_wmb( ) to safely communicate the change in value from the updater to readers.

In FIG. 3, the update operation comprises the insertion of an element in a sorted singly-linked list data structure. It will be appreciated that other update operations, such as list element deletions and modifications, may be performed in analogous fashion. In FIG. 3, RCU is used by the LLSM subsystem 24 to protect an updater 18 as it traverses the data structure to find the list element insertion point. During this traversal, the updater 18 acts as a reader and thus uses the rcu_read_lock( ) and rcu_read_unlock( ) primitives to demarcate the read-side critical section. In addition, the updater 18 uses rcu_dereference( ) when dereferencing list pointers. The list traversal operation may be facilitated by utilizing an additional field in each list element that indicates whether the element has been deleted.

Following the list traversal, the updater 18 performs the list insertion using an HTM transaction that covers only the element to be inserted and the two adjacent list elements. The HTM transaction is limited to these list elements regardless of the length of the traversal required to reach the insertion point. As part of the HTM transaction, deleted elements have their →deleted fields set to 1 and an RCU request for deferred-destruction is made (e.g., using the primitives call_rcu( ) or synchronize_rcu( ). The LLSM subsystem 24 will therefore await a grace period before freeing memory allocated to the deleted elements for possible reuse.

Line 1 declares the insert( ) function. The "key" parameter is the key value for the element to be inserted. Line 2 begins the function definition. Line 3 allocates the storage for the element "p" to be inserted into the list, while lines 4-6 declare temporary variables. Lines 8 and 9 initialize element "p," namely, its key value and its →deleted field. Lines 11-33 execute as a single RCU read-side critical section. This critical section is initiated using the rcu_read_lock( ) primitive to advise the LLSM subsystem 24 that the updater 18 is accessing RCU-protected data. Any pre-existing elements referenced within this section of code must persist for the duration, due to the definition of an RCU grace period. This means that any code that deletes elements from this list must use call_rcu( ) or synchronize_rcu( ) to defer freeing of the deleted elements, but only after first setting those elements'→deleted flags.

Lines 12-17 find the first element of the list with a key greater than or equal to that of the element to be inserted. The rcu_dereference( ) primitive on lines 14-15 ensures that the updater 18 will see initialized versions of the →key and → next fields in each list element "q" being evaluated. Line 18 begins an update transaction using the HTM subsystem 22. Initially, the return value will be non-zero, so that execution will proceed with line 22. However, if the transaction later aborts, whether due to conflicts with another transaction or due to execution of abort_transaction( ) on line 25, execution will revert back to begin_transaction( ) on line 18, but with a zero return value, so that line 19 exits the RCU read-side critical section by calling the rcu_read_unlock( ) primitive and line 20 retries the search and the transaction.

In absence of transaction conflicts, line 22 picks up the pointer to the element that is to follow the element "p" being inserted. Line 23 checks if the element "qprev" that is to precede element "p" is non-NULL and has been deleted, or if it does not reference the element "qnext" that is to follow "p" (in other words, some other thread has concurrently inserted an element between "qprev" and "qnext"). If the evaluations of line 23 prove false, line 24 checks to make sure that if "qnext" is non-NULL, then the "qnext→deleted" flag has not yet been set. If it has, some other thread has interfered with the attempted insertion, and therefore line 25 aborts the transaction. As alluded to earlier, this will cause control to revert to line 10 via line 20.

If there is no need to manually abort the transaction, then execution continues with line 26, which checks to see whether the key being inserted is already in the list. If not, lines 27-28 insert the new element, and line 29 sets up the return value to indicate success. Otherwise, line 31 sets up the return value to indicate failure. Line 32 ends the transaction, and, as noted earlier, line 33 ends the RCU read-side critical section with the call to the rcu_read_unlock( ) primitive. Line 34 indicates success or failure to the caller.

Had this update been a list element deletion or modification, the updater 18 would have set the →deleted flag of either the element being deleted or a pre-update version of the element being modified. The updater would have then invoked either call_rcu ( ) or synchronize_rcu( ) to initiate deferred destruction of the flagged element. These operations would be implemented as part of the HTM transaction (i.e., somewhere between begin_transaction( ) and end_transaction( )).

Second Example Embodiment Using Small Transactions, Java™ Volatile Variables and Java™ Garbage Collection Turning now to FIG. 4, example pseudocode is shown in which the LLSM subsystem 24 implements lockless synchronization using a series of small list traversal transactions, Java™ volatile variables and Java™ garbage collection to protect an updater's data structure traversal to the update point. Small transactions and the use of Java™ volatile variables protect the list pointer accesses during the traversal. The properties of Java™ volatile variables are such that normal reads from such variables constrain both CPU and compiler optimizations such that the synchronization guarantees are at least as robust as those provided by rcu_dereference( ). In addition, the Java™ garbage collector automatically provides the functionality supplied by the call_rcu( ) and synchronize_rcu( ) primitives.

FIG. 4 shows how insertion into a sorted singly-linked list may be carried out in accordance with this embodiment. Line 1 declares the insert( ) method. The "key" parameter is the key value for the "node" element to be inserted. Line 2 comments that the "node.next" field of "node" is declared to be volatile. Line 3 declares the "node" variable itself and allocates a new Node instance. Lines 4-27 find the first element of the list with a key greater than or equal to that of the "node" element. This is performed using a series of small HTM transactions, each in the form of a Java™ atomic block to safely traverse the "next" pointer leading from one Node to the next (see lines 15-18). This atomic block serves the same purpose as does rcu_dereference( ) in the RCU embodiment shown in FIG. 3. Note that the "atomic" keyword is conventionally implemented using software transactional memory (STM) primitives that invoke an STM infrastructure (see Harris et al., "Language Support for Lightweight Transactions," Proc. 18th Annual ACM SIGPLAN Conf. on Object-Oriented Programming System, Languages, and Applications, 2003, pp. 388-402). However, the atomic keyword may also be implemented in terms of HTM primitives that invoke the HTM subsystem 22. Lines 5-9 declare temporary variables. Line 29 repeats the search if no insertion point is found. Line 30 initializes the "ret" return value to false. Line 31 begins the update transaction, again using the Java™ atomic keyword implemented using the HTM subsystem 22. Line 32 checks to make sure that some other thread has not deleted the element "prev" that is to precede the new "node" element, or deleted the element "cur" that is to follow "prev," or inserted a new element between "prev" and "cur." Note that deletion of the "prev" element will be detected by line 32 if it is assumed that the deletion code employed by other threads NULLs out the "next" pointer field within the element being deleted. Such a deletion will also cause the small transaction of lines 15-18 to fail during list traversal, setting the "valid" local variable to zero in line 17 and producing a retry of the list traversal in line 19. This obviates the need to provide a "delete" field in each list element, as was the case in the previous RCU embodiment. If line 32 does not detect a deletion or an insertion, lines 33-34 insert the new element, line 35 sets up the "ret" return value to indicate success, and the insert( ) method returns success in line 38. Otherwise, if line 32 indicates that the new element should not be inserted, lines 37-39 restart the search.

Third Example Embodiment Using Small Transactions And Non-Java™ Garbage Collection Turning now to FIG. 5, example pseudocode is shown in which the LLSM subsystem 24 implements small list traversal transactions and may be used with non-Java™ garbage collection to protect an updater's data structure traversal to the update point. The list traversal transactions are handled by a macro called atomic_advance( ). This macro invokes the HTM subsystem 22 with calls to begin_transaction( ) and end_transaction( ). Note that FIG. 5 shows only the atomic_advance( ) transaction code; it does not show any list traversal code. The atomic_advance( ) macro can be used to traverse a linked list with a series of small HTM transactions in much the same fashion as lines 15-18 of FIG. 4. However, the atomic_advance( ) macro may be used for non-Java™ environments that do not have built-in transaction functionality such as that provided by the "atomic" keyword. For example, atomic_advance( ) could be used when fetching a pointer to the next list element in the RCU embodiment of FIG. 3. This usage would replace the rcu_dereference( ) primitive. The atomic_advance( ) macro could also be used in non-RCU environments. In that case, threads that modify linked list elements will rely on some other form of garbage collection to defer the destruction of deleted elements. Note that the foregoing discussion does not rule out use of atomic_advance( ) in Java™ environments. For example, HTM transactions implemented by atomic_advance( ) might be desirable if the Java™ "atomic" keyword used STM or some other form of transactional memory that was not desired for list traversal.

Fourth Example Embodiment Using Small Transactions and Hazard Pointers

Turning now to FIG. 6, example pseudocode is shown in which the LLSM subsystem 24 uses a series of small list traversal transactions and hazard pointers to protect an updater's data structure traversal to the update point. As is known, a hazard pointer is an element that prevents the premature reclamation of memory allocated to shared data elements. Each thread keeps a list of hazard pointers indicating which data elements the thread may later access. This list can only be written to by the particular thread, but can be read by any other thread. When a thread wishes to remove a data element, it places it on a private list and periodically scans the lists of all other threads for pointers referencing that element. If no such pointers are found the memory occupied by the element can be safely freed. Hazard pointers may be used by the LLSM subsystem 24 to protect the updater 18 traversing a data structure to the point of modification. As in the case of the Java™ embodiment of FIG. 4, this typically requires that any deleted node's next pointer be set to NULL to indicate that it has in fact been deleted.

FIG. 6 shows how hazard pointers may be used to protect an updater's traversal of a sorted singly-linked list in order to insert a new element. As in previous sections, the update transaction covers only the element to be inserted and the two adjacent elements, regardless of the length of the traversal required to reach the insertion point. Deleted elements must wait until there are no hazard pointers referencing them before they may be freed for possible reuse. Normally, the hazard-pointer-setting operation would be implemented by a pair of assignments, a memory barrier, and a recheck, all inside a loop. Although this approach could also be used when searching, given HTM, these operations may also be implemented by enclosing the pointer dereferences and the setting of hazard pointers inside a small HTM transaction, as shown in FIG. 6. The use of small HTM transactions should provide a more efficient implementation of hazard pointers by removing the need for a memory barrier.

Line 1 of FIG. 6 declares the insert( )method. The "key" parameter is the key value for the new "node" element to be inserted. Line 2 declares the "node" variable itself and allocates a new Node instance. Lines 3-31 find the first element of the list with a key greater than or equal to that of the element to be inserted. Lines 4-6 declare temporary variables. Lines 7-10 implement a small transaction using the HTM subsystem 22 that sets a hazard pointer for the current element "cur." Lines 16-21 implement another small transaction using the HTM subsystem 22 that sets a second hazard pointer for the current element "cur" and first hazard pointer for the "cur→next" element. Line 33-39 implement an update transaction using the HTM subsystem 22 to perform the insertion. If the specified key is not yet in the list and in absence of transaction conflicts, line 37 sets up the "ret" return value to indicate success, and the insert( ) method returns success in line 44. Otherwise, line 41 restarts the search if the new element was not inserted and line 44 returns failure if the specified key was already in the list. Transaction conflicts due to deletions and insertions at the update point by other threads will be detected at line 34 in the same manner as line 32 of FIG. 4.

Fifth Example Embodiment Using Watch Primitives

Turning now to FIG. 7, example pseudocode is shown in which the LLSM 24 implements watch primitives. Providing watch functionality to permit a location to be monitored for modification by other threads is similar to the protections provided in software by hazard pointers, which in turn permits RCU-like algorithms to be brought to bear. This watch functionality may be implemented using special cache algorithms and related processor instructions for marking fine-grained blocks of memory to ensure data consistency (see, e.g., Saha et al., "Architectural Support for Software Transactional Memory, The $39^{th}$ Annual IEEE/ACM International Symposium on Microarchitecture, 2006, pp. 1-12). The LL/SC (Load Link/Store Conditional) functionality in many RISC (Reduced Instruction Set Computer) processors is broadly similar. Generally speaking, watch functionality allows multiple outstanding LL instructions. It may be implemented using the following primitives:

load_and_set_watch( ): load a value and set a watch on the memory location.

check_all_watches: check all previously set watches, indicating via condition codes if of the corresponding locations might have been modified.

clear_watch( ): clear a single previously set watch.

clear_all_watches( ): clear all watches

It should be noted that some implementations of watch functionality might actually set on cache lines rather than on individual variables. Therefore, code using watch primitives in such implementations must take care when a pair of watched locations share a given cache line, as clear_watch( ) will clear the watches on both locations. A w_same_cache_line( ) primitive is used that would always return FALSE for implementations with fine-grained watch-setting capabilities, and would indicate sharing otherwise. In addition, any outstanding watches need to be added by begin_transaction( ) to the new transaction's conflict set, so that the end_transaction( ) can be thought of as including an implicit check_all_watches( ).

FIG. 7 shows how watches can be used to guard insertion into a sorted singly-linked list. Again, the transaction covers only the element being inserted and the two adjacent elements. The arbitrarily long path to the insertion point is protected by setting watches using the load_and_set_watch( ) primitive, with at most two such watches being required at any given time. Line 1 of FIG. 7 declares the insert( ) method. The "key" parameter is the key value for the "node" element to be inserted. Line 2 declares the "node" variable itself and allocates a Node instance. Lines 3-24 find the first element of the list with a key greater than or equal to that of the element to be inserted. Lines 4-6 declare temporary variables, with line 6 using the load_and_set_watch( ) primitive to set a watch on the "cur" element. Line 12 uses the load_and_set_watch( ) primitive to set a watch on the "cur→next" element. Line 13 initializes a variable "k" to the key of the current element "cur." Line 14 performs a check_all_watches( ) to check for modifications to "cur" and "cur→next" by other threads, then restarts the search if modifications occurred. Line 16 checks if the "node" element to be inserted is already in the list and if so, performs a clear_all_watches( ) to clear the previous watches, and returns indicating failure. Lines 20-21 check if the watched locations "cur→next" and "prev" share the same cache line. If not, clear_watch( ) is called to remove the watch on the "prev" element. Lines 27-31 implement an update transaction using the HTM subsystem 22 to perform the insertion. In absence of transaction conflicts, line 30 sets up the "ret" return value to indicate success, and the insert( ) method returns success in line 32 after clearing all watches. Otherwise, line 34 restarts the search if the new element was not inserted.

Accordingly, a technique has been disclosed for applying limited size hardware transactional memory to arbitrarily large data structures. It will be appreciated that the foregoing concepts may be variously embodied in any of a data processing system, a machine implemented method, and a computer program product in which digitally encoded program instructions are stored on one or more computer-readable data storage media for use in controlling a computer or other data processing machine to perform the disclosed operations. The program instructions may be comprise machine language code that is ready for loading and execution by the machine apparatus, or the program instructions may comprise a higher level language that can be assembled, compiled or interpreted into machine language. Example high level languages include, but are not limited to assembly, C, C++, to name but a few. When implemented on a machine comprising a CPU, the program instructions combine with the CPU to provide a particular machine that operates analogously to specific logic circuits, which themselves could be used for the invention.

Example data storage media for storing such program instructions are shown by reference numeral 100 in FIG. 8. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions of the invention either alone or in conjunction with an operating system or other software product that incorporates the required functionality. The storage media could also be provided by portable magnetic storage media (such as floppy disks, flash memory sticks, etc.), or magnetic storage media combined with drive systems (e.g. disk drives), or storage media incorporated in data processing platforms, such as random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a data processing system having at least one CPU, a memory operatively coupled to said CPU, said memory including a storage medium tangibly embodying a program of instructions that are executable on said at least one CPU to perform machine-implemented operations, said operations implementing a method for using hardware transactional memory to update a data structure, comprising:
a data updater traversing said data structure to locate an update point using a lockless synchronization technique that synchronizes said data updater with other updaters that may be concurrently updating said data structure;
said lockless synchronization being selected from the group consisting of (1) a synchronization technique that uses volatile variables and garbage collection, (2) a synchronization technique that uses plural list traversal transactions, or (3) a synchronization technique that uses watch primitives; and
upon reaching said update point, said updater performing an update on said data structure using a hardware transactional memory transaction that operates at said update point.

2. A system, comprising:
a CPU;
a memory operatively coupled to said CPU, said memory tangibly embodying a program of instructions executable by said CPU to perform operations that implement a method for using hardware transactional memory to update a data structure, comprising:
a data updater traversing said data structure to locate an update point using a lockless synchronization technique that synchronizes said data updater with other updaters that may be concurrently updating said data structure;
said lockless synchronization being selected from the group consisting of (1) a synchronization technique that uses volatile variables and garbage collection, (2) a synchronization technique that uses plural list traversal transactions, or (3) a synchronization technique that uses watch primitives; and
upon reaching said update point, said updater performing an update on said data structure using a hardware transactional memory transaction that operates at said update point.

3. A computer program product, comprising:
one or more non-transitory computer-readable storage media:
program instructions stored on said one or more media for programming a CPU to perform operations that implement a method for using hardware transactional memory to update a data structure, comprising:
a data updater traversing said data structure to locate an update point using a lockless synchronization technique that synchronizes said data updater with other updaters that may be concurrently updating said data structure;
said lockless synchronization being selected from the group consisting of (1) a synchronization technique that uses volatile variables and garbage collection, (2) a synchronization technique that uses plural list traversal transactions, or (3) a synchronization technique that uses watch primitives: and
upon reaching said update point, said updater performing an update on said data structure using a hardware transactional memory transaction that operates at said update point.

4. A machine implemented method for using hardware transactional memory to update a data structure, comprising:
a data updater traversing said data structure to locate an update point using a lockless synchronization technique that synchronizes said data updater with other updaters that may be concurrently updating said data structure;
upon reaching said update point, said updater performing an update on said data structure using a hardware transactional memory transaction that operates at said update point; and
said lockless synchronization uses one or more of (1) volatile variables and garbage collection, (2) plural list traversal transactions, or (3) watch primitives.

5. The method of claim 4 wherein said data structure comprises a linked list and said update comprises inserting, deleting or modifying a list element.

* * * * *